United States Patent

[11] 3,602,381

[72] Inventors Harrie Arthur Size
Torrance, Calif.;
Norman J. Glomski, Bowling Green, Ohio
[21] Appl. No. 870,656
[22] Filed Oct. 27, 1969
[45] Patented Aug. 31, 1971
[73] Assignee Daybrook-Ottawa Corporation

[54] LOAD-LIFTING TAILGATE
11 Claims, 10 Drawing Figs.
[52] U.S. Cl. ..................................................... 214/77 P
[51] Int. Cl. ..................................................... B60p 1/48
[50] Field of Search ........................................... 214/77 P,
DIG. 10

[56] References Cited
UNITED STATES PATENTS
2,656,058 10/1953 Foote ........................... 214/77 P
3,035,721 5/1962 McCarty et al. ............... 214/77 P
3,057,491 10/1962 Schlensker ..................... 214/77 P
3,257,011 6/1966 Randall et al. ................. 214/77 P Primary Examiner—Gerald M. Forlenza
Assistant Examiner—Robert J. Spar
Attorney—Ely, Golrick & Flynn ABSTRACT: Mechanism permitting a tailgate structure for opening and closing a truck body to also lift and lower loads between the truck bed level and ground. A parallelogrammatic linkage, powered by means for extending or contracting a diagonal of it, provides essentially level movement from ground to truck bed height when the structure is to function as a load lifting or lowering platform but, upon holding one arm of the linkage, can cause the structure to swing from a relatively horizontal load-platform position at truck bed height to vertical position where the structure functions as a tailgate. An interlock prevents actuation of the mechanism to move the structure to or from its tailgate position unless the said arm is securely held.

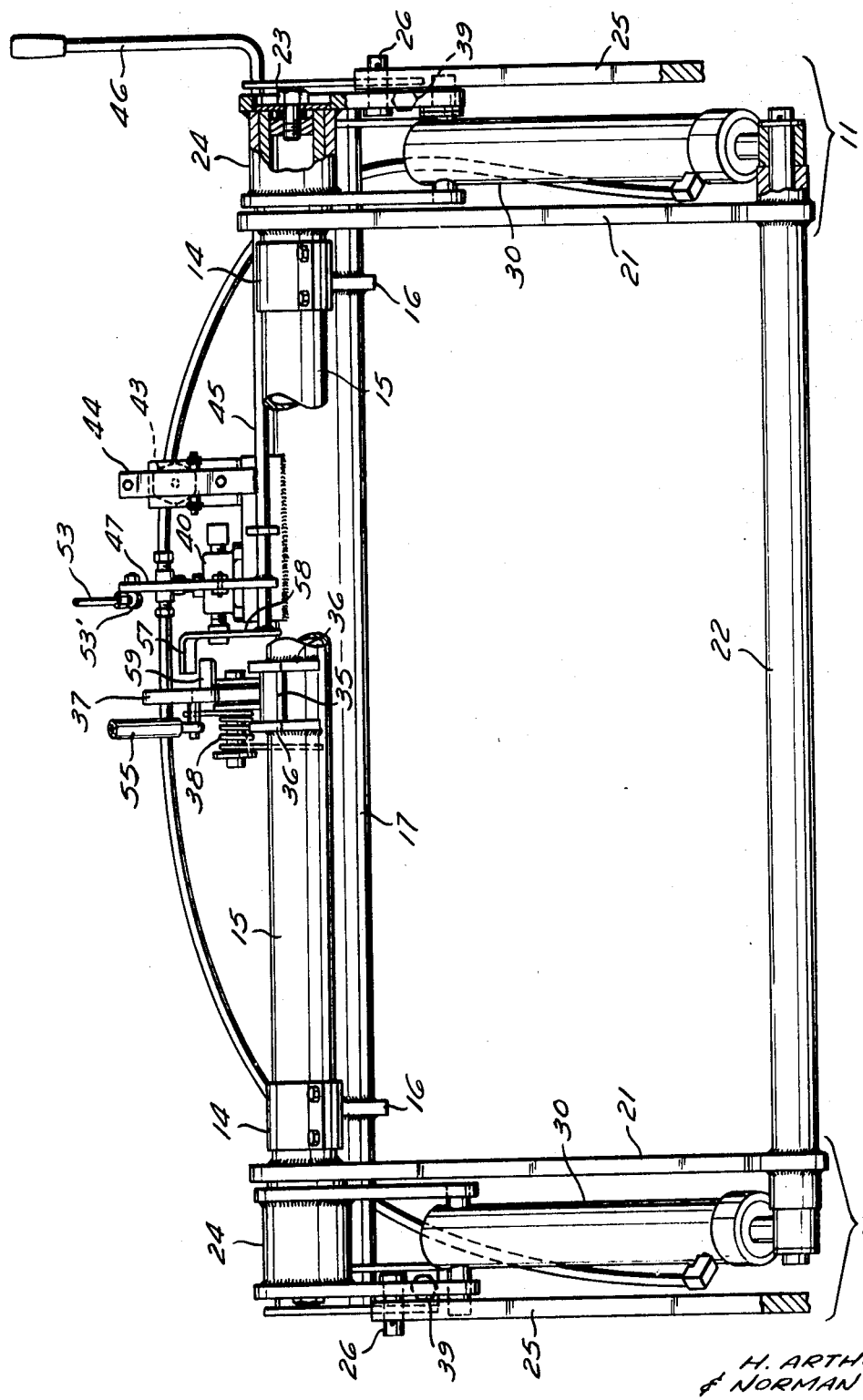

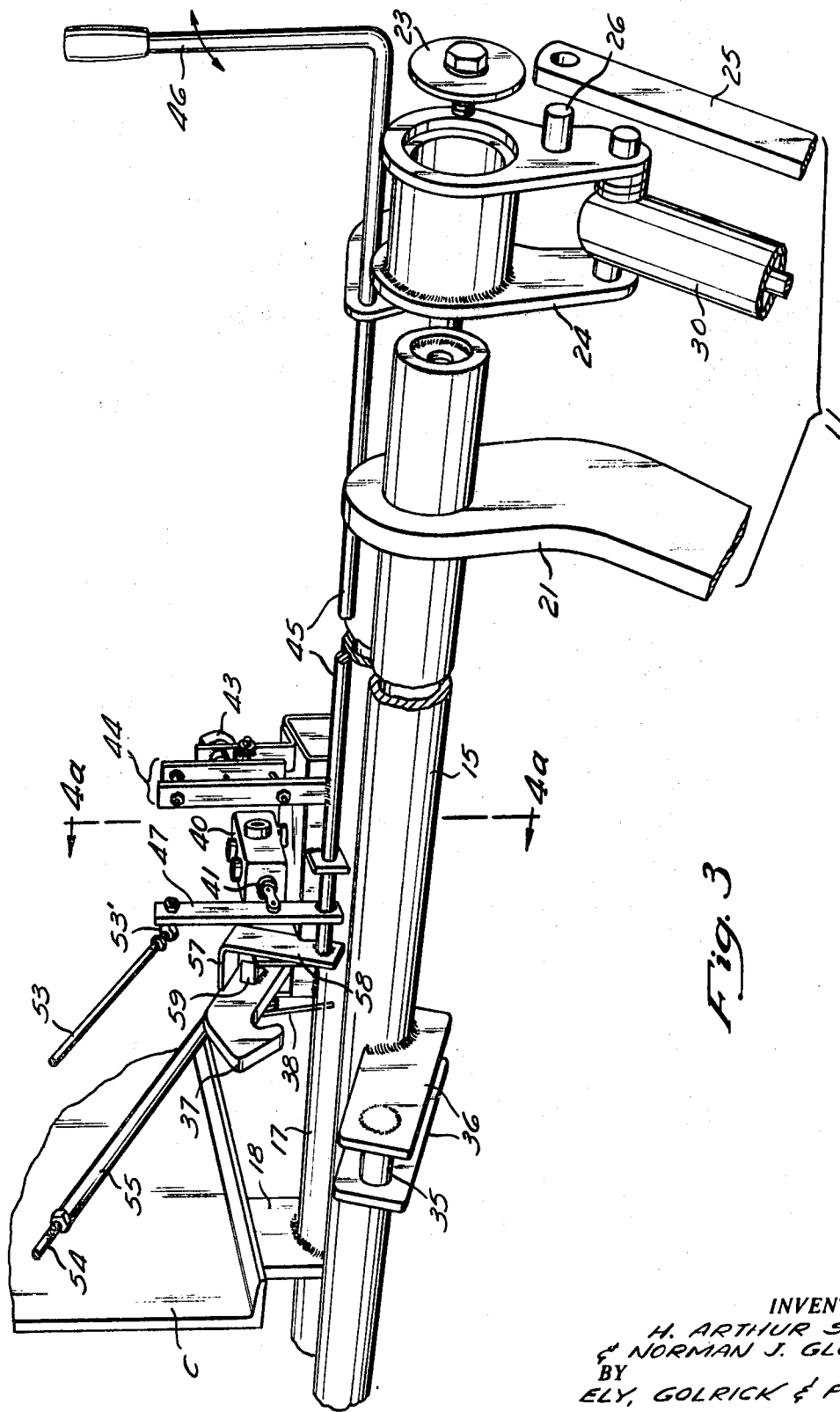

INVENTORS
H. ARTHUR SIZE,
& NORMAN J. GLOMSKI
BY
ELY, GOLRICK & FLYNN

ATTORNEYS

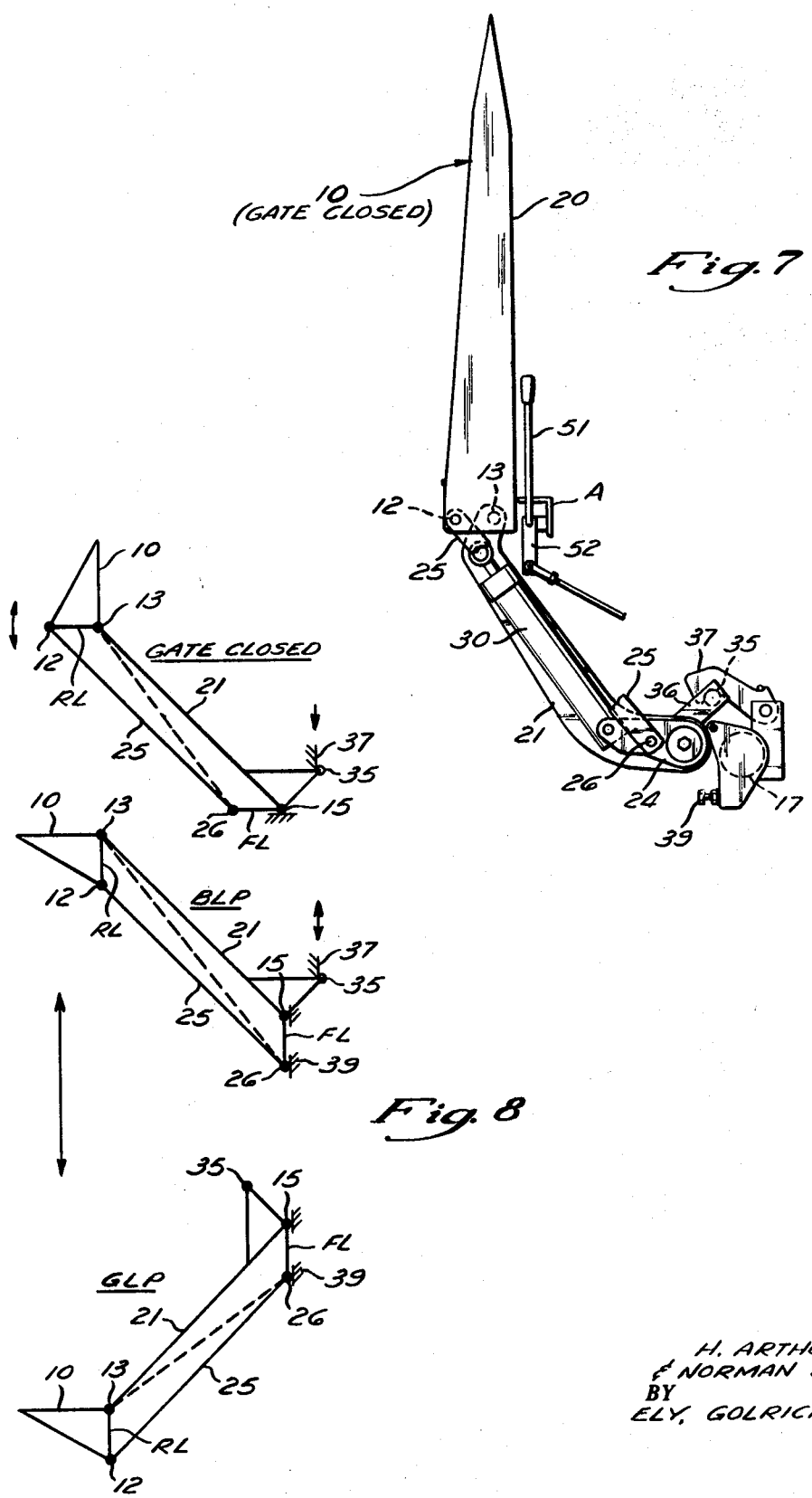

LOAD-LIFTING TAILGATE

This invention relates to improvements in power-actuated structures adapted to function as tail gates for closing the rear of truck bodies and which, when opened to the level of the truck body bed, may then function as platforms by which loads to be carries by the trucks may be raised or lowered between the truck bed level and ground level. More particularly this invention relates to an improved mechanism and its controls for so operating a tailgate structure.

The truck-equipment art has provided various types of powered tail gates which pivot about a horizontal axis so as to function, in a vertical position, as closures for the ends of end-loaded truck bodies and, when pivoted to a horizontal position, as platforms for lifting loads to and from the truck bed level to ground level or to the from loading docks which may be at lower levels than the truck beds when the trucks are backed into position for transfer of loads to and from the docks. Such tail gates may also function as bridges between loading docks at approximately the same level as the truck beds where, due to ground level conditions, requisite parking angles, or the like, a truck closed by vertically pivoted doors could not be backed up to a loading dock so that the outer edge of its bed would abut the edge of the loading dock. Such powered tail gates have become increasingly necessary pieces of truck equipment for cartage and like operations in which loading facilities for both pickup and delivery seldom permit loading to and from a dock at the same level as the truck bed and to which dock the end of the truck can be backed for load transfer directly between the dock and truck bed.

Early powered tailgates used by the trucking industry were powered, usually by hydraulic cylinders, only when used as horizontal lifting platforms to and from the bed level (hereafter frequently referred to simply as the "lifting" operation), such gates being manually hingeable between the truck bed level and the vertical position closing the truck body as a tailgate (hereafter frequently referred to simply as the "closing" operation). Such manually closed gates, particularly as the demand has developed for heavy tailgates capable of handling heavy loads during the lifting operation, have become increasingly impractical and obsolete; this has been due both to the physical strain on the truck drivers and helpers in moving a heavy gate to a closed position and the unavoidable tendency to such personnel, after unlocking such a closed tailgate, to simply allow it to fall noisily to its bed-level position, with a consequent likelihood of damage to the gate and its lifting mechanism.

Heretofore, the efforts to provide a lifting tail gate which is power actuated both in its lifting operations and closing operations have been far from satisfactory. The mechanisms heretofore available have been unduly complex, often requiring one or more cylinders or like powering means for the closing operation separate and apart from the power means required for the lifting operation. In addition to the initial expense of such mechanisms, their complexity also made them difficult to inspect, service, and maintain. Maintenance presents a particularly serious problem due to the unavoidable exposure of operating elements to damage from collision and traffic-thrown rocks and stones as well as traffic grime and dirt likely to impair the bearings and like highly finished surfaces necessary for operation of the mechanism.

It is an object and advantage of this invention that it permits powered operation both for lifting and closing operations by one set of hydraulic cylinders operating a mechanism which is especially rugged and involves relatively fewer parts and elements than heretofore required. Accordingly, both initial costs and inspection, service, and maintenance are minimized and simplified even though kinematics of the linkage achieving selective level lifting and pivotal closing operations is complex. The basically rugged simplicity of structure also allows the mechanism to be designed for lifting heavy loads while maintaining the safety and stability of the tailgate as lifting platform.

Other objects and advantages of this invention will be apparent from the following specification, claims, and drawings, in which:

FIG. 2 is a fragmentary end view, partly in section, of the gate operating mechanism (less the controls and gate, per se) as shown in FIG. 1, but with the gate lowered to its ground level position.

FIG. 3 is an enlarged detail perspective, partly exploded, of the main frame and lifting assembly as shown in FIG. 2, particularly showing the control means and, for clarity of illustration, omitting various support brackets and, at the right, a truck chassis frame member.

FIG. 7 is a side view, similar to FIGS. 4 and 5, but showing the position of the elements when the gate is raised to its vertical closing position.

FIG. 8 is a kinematic analysis of the relative movements of the tailgate as though the gate operating linkage shown in FIGS. 1 to 7 were a true parallelogram linkage.

Figure 1:
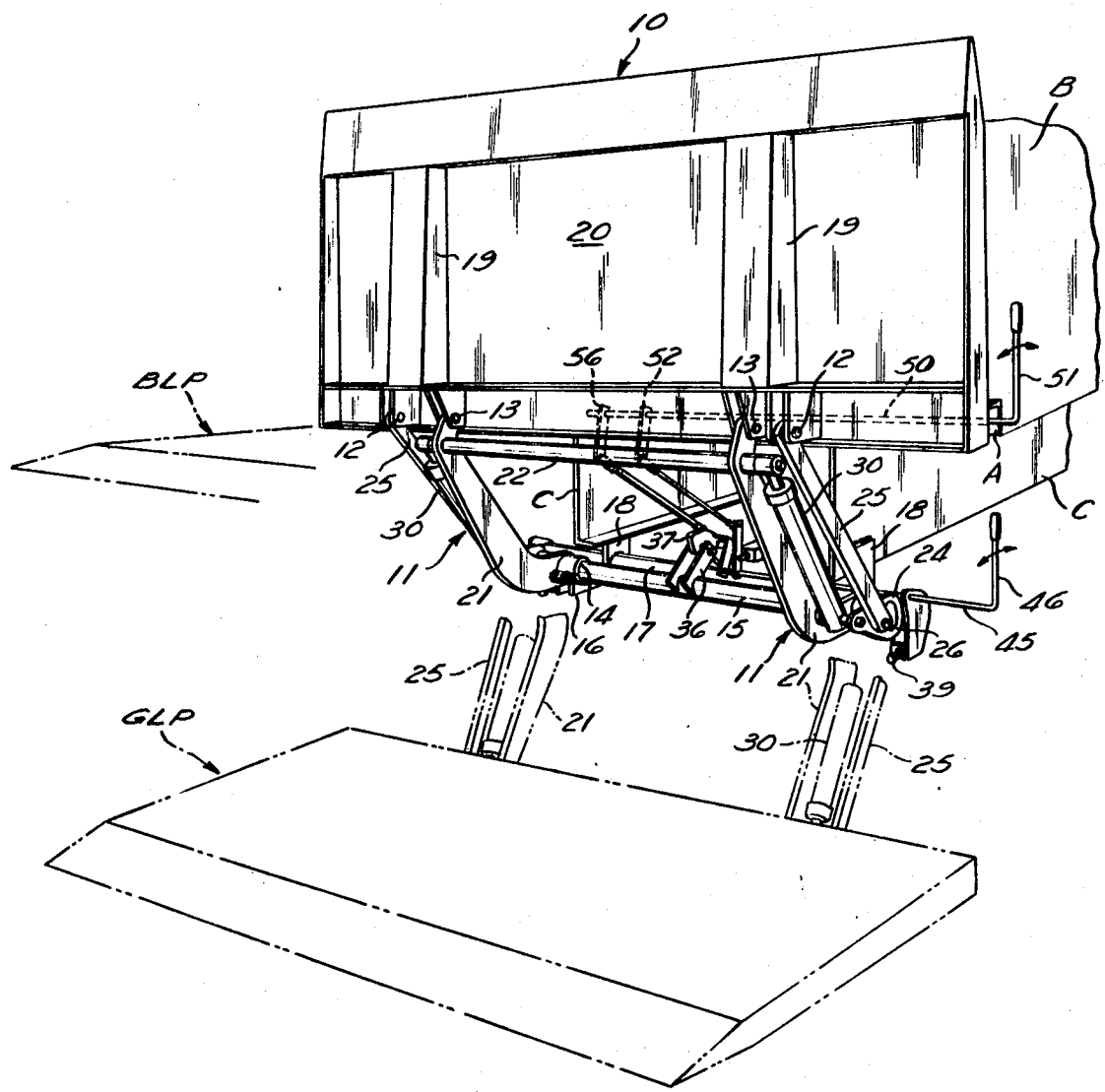
FIG. 1 is a perspective, showing at the end of a truck body and chassis partly broken away, a tailgate operating mechanism made according to this invention. In this view the gate, per se, is shown in its fully closed position with phantom showings of the gate in its lowered and raised positions when it functions as a load-lifting platform.

Referring to FIG. 1, the tailgate 10 functions as a gate closing the open end of a truck body B mounted on the truck chassis members C. The gate is supported in this vertical position and its other positions by means of duplicate linkages 11, the outer ends of the arms of each of these linkages being secured by pivots 12 and 13 in brackets on the underside of the gate. As best shown by comparing FIGS. 1 and 4, the pivots 12 and 13 are both spaced laterally from each other (to provide stability with respect to the actuating hydraulic cylinder included between the arms of each linkage) and act on spaced parallel axes. Thus, it should be noted that the parallel axes of the pivots 12 and 13 effectively constitute, by means of their respective brackets integral with the gate 12, the rearward links RL (see FIG. 2) in the parallelogrammatic operating linkage hereafter more fully described.

The linkages 11 are supported by means of the forward linkage tube 15 journaled for pivotal movement in the bearing brackets 14 carried by bracket plates 16 fixed to the main frame tube 17. The main frame tube 17 is secured by the frame plates 18 to the truck chassis members C. Except for the incidental upper control rod bracket plates fixed in the angle iron A constituting the rear edge of the truck body bed, the frame plates 18 provide the sole means by which the entire gate and its associated operating mechanism are fixed to the truck chassis; accordingly, after the plates 18 have been temporarily secured and positioned during installation of the gate assembly on a truck, the plates 18 are then usually welded to the chassis frame members C to effect a relatively permanent mounting of the assembly on the truck. In this connection, it should be obvious that in a proper installation the gate is centered to close the rear opening of the truck body. Also, the linkages 11 are symmetrically located, usually outboard of the plates 18 and equidistant from the sides of the gate 10 to provide maximum stability and resist twisting of the gate while it is lifting or lowering a load that may be placed offcenter on the platform surface plate 20 of the gate. The channels 19, substantially aligned with the linkages 11, which stiffen the platform surface plate 20 are likewise symmetrically located in the gate (the appearance of a greater spacing between the righthand side edge of the gate and its adjacent channel 19 than the spacing between the left-hand side edge of the gate and its adjacent channel, as shown in FIG. 1, is simply due to foreshortening in this perspective view).

OPERATING LINKAGES

The dominant objective of the assembly made according to this invention is, or course, to move the gate 10 between its vertical closing position shown in FIG. 1 to its bed-level portion BLP, as shown in phantom, in order to open and close the gate and to move the gate between its bed-level position BLP and its ground level position GLP, also shown in phantom, in order to raise and lower loads to be carried by the truck, all by operation of the appropriate control rod levers 46 and 51. The means by which this objective is accomplished is as follows:

Each linkage 11 is comprised of an arm 21 fixed to the pivotal forward linkage tube 15; these two arms, because they carry the main lifting loads imposed on the linkages while raising and lowering the gate between the positions BLP and GLP, being hereafter referred to as "lifting" arms; they are joined by a transverse rear linkage tube 22 adjacent their respective pivot pins 13. The thickness and depth of section of each of the lifting arms 21 between the linkage tubes 15 and 22 are to provide adequate rigidity to the linkages 11 while the gate functions as a loading platform.

As best shown in the exploded view of FIG. 3, each linkage 11 includes a forward link fork 24 pivotally mounted as a bearing on the forward linkage tube 15 and outboard of the adjacent lifting arm 21, each link fork 24 being retained on an end of the forward linkage tube 15 by means of a keeper bolt and washer 23. The outer tine of each forward link fork 24 carries a pivot pin 26 on which the forward end of a compression link 25 is mounted, the outer ends of the compression links 25 being pivoted on the bracket-mounted pivot pins 12 in gate 10. The distance between the center line of the forward linkage tube 15 and the center line of each pivot pin 26 thus constitutes a forward link FL (see FIG. 4) which, together with its substantially parallel effective link RL, constitute one opposed pair of links in a parallelogrammatic gate-operating linkage 11, the connecting opposed pair of links in each such linkage being a lifting arm 21 and its associated compression link 25. Although each lifting arm 21 is curved to provide a stiffening depth of section, it is to be noted that it extends between the upper pivot center of the link fork 24 (also the axis of the linkage tube 15) and the upper pivot center provided by the pivot pin 13 and thus, as viewed in FIGS. 4, 5, and 7, effectively constitutes the upper link, with respect to the compression link 25, of the opposed pair of connecting links between links RL and FL in each linkage 11.

If a precisely level rise of the gate between the positions GLP and BLP is required, the distance between the axes of the pivots 12 and 13 is made precisely equal to the distance between the axes of the forward linkage tube 15 and a pivot pin 26 and the distance between the axes of the tube 15 and a pivot pin 13 is made precisely equal to the distance between the axes of pivot pins 12 and 26, whereby a precise parallelogram linkage is provided. Most users of powered lifting tailgates, however, prefer a so-called ramping action; that is, to aid in loading and unloading at the GLP, the platform surface 20 of the gate 10 slopes slightly upwardly (see FIG. 4) and at the BLP, the surface slopes slightly downwardly toward the truck bed (see FIG. 5). To achieve this ramping action, one link of an opposed pair in each linkage 11 is made slightly shorter, as is the link RL in this disclosed embodiment, so that the actual configuration of a linkage 11 is actually slightly trapezoidal in order to achieve a ramping action. It is to be understood that the term "parallelogrammatic" is intended to be generic to linkages providing a ramping action as well as those having a true parallelogram configuration to provide a precise level rise of the tailgate in its lifting operation.

In order to power the operation of the linkage 11 in moving the gate 10 so as to achieve a substantially level movement between GLP and BLP and a pivotal movement between BLP and the closing position, each linkage includes a double-acting hydraulic cylinder 30 pivotally mounted at its cylinder end between the tines of the link fork 24 and pivotally connected at its piston end to an extension of the rearward linkage tube 22 outboard of each lifting arm 21. As so positioned, each cylinder 30 can exert forces diagonally across its respective parallelogrammatic linkage 11; because each cylinder 30 is double-acting, the forces it exerts may be either to extend or to contract the diagonal.

To complete the gate operating linkage of this invention (apart from the controls) a key and vitalizing element, particularly with respect to the movement of the gate 10 between BLP and the closed position, is a latching mechanism normally operative when the gate is raised to BLP. This mechanism comprises a latch pin 35 carried between upstanding crankarms 36 integral with the pivoted forward linkage tube 15 and a latching hook 37 pivotally mounted on the main frame tube 17 so as to extend toward the pin 35. The hook 37 is biased toward a latching position by a spring 38 and the edge of the hook ahead of its bight constitutes a cam surface whereby, as the tube 15 is pivoted clockwise (see FIGS. 3 to 7) to move the pin 35 toward the hook 37, the latch pin raises the hook until the pin passes under the point of the hook and is latched in its bight. Thereupon the linkage tube 15 will be locked against the counterclockwise rotation until released from the hook by activation of the controls and the tube 15, together with its integral compression arms 21, effectively become fixed members while the tube 15 is so locked.

LINKAGE OPERATION

The operation of the gate-operating linkage is perhaps most readily understood if it is first noted that, but for the latching action provided by the hook 37, the gate 10 and its associated linkages 11, irrespective of the amount of extension or contraction of the actuating cylinders 30, would be freely rotatable from the maximum closed position of the gate shown in FIGS. 1 and 7 to ground level by unrestrained rotation of the forward linkage tube 15 in the bearing brackets 14. Indeed, with the cylinders 30 fully retracted, the positioning of the gate 10 at a selected GLP is controlled by adjusting the stop bolts 39 carried by end brackets on the main frame tube 17. The stop bolts 39 engage forward edges of the tines of the link forks 24 so as to adjust the vertical portions of the forks 24 and serve as fixed surfaces which the forks engage while the gate 10 is actuated between GLP and BLP (see FIGS. 4 and 5).

Figure 4A:
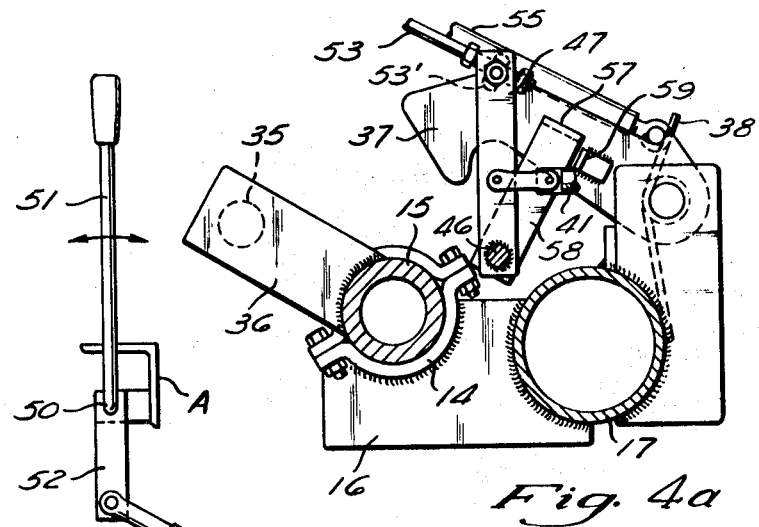
FIG. 4a is a detailed cross section taken along the line 4a–4a of FIG. 3, omitting the hydraulic control valve for clarity of illustration.
Figure 4:
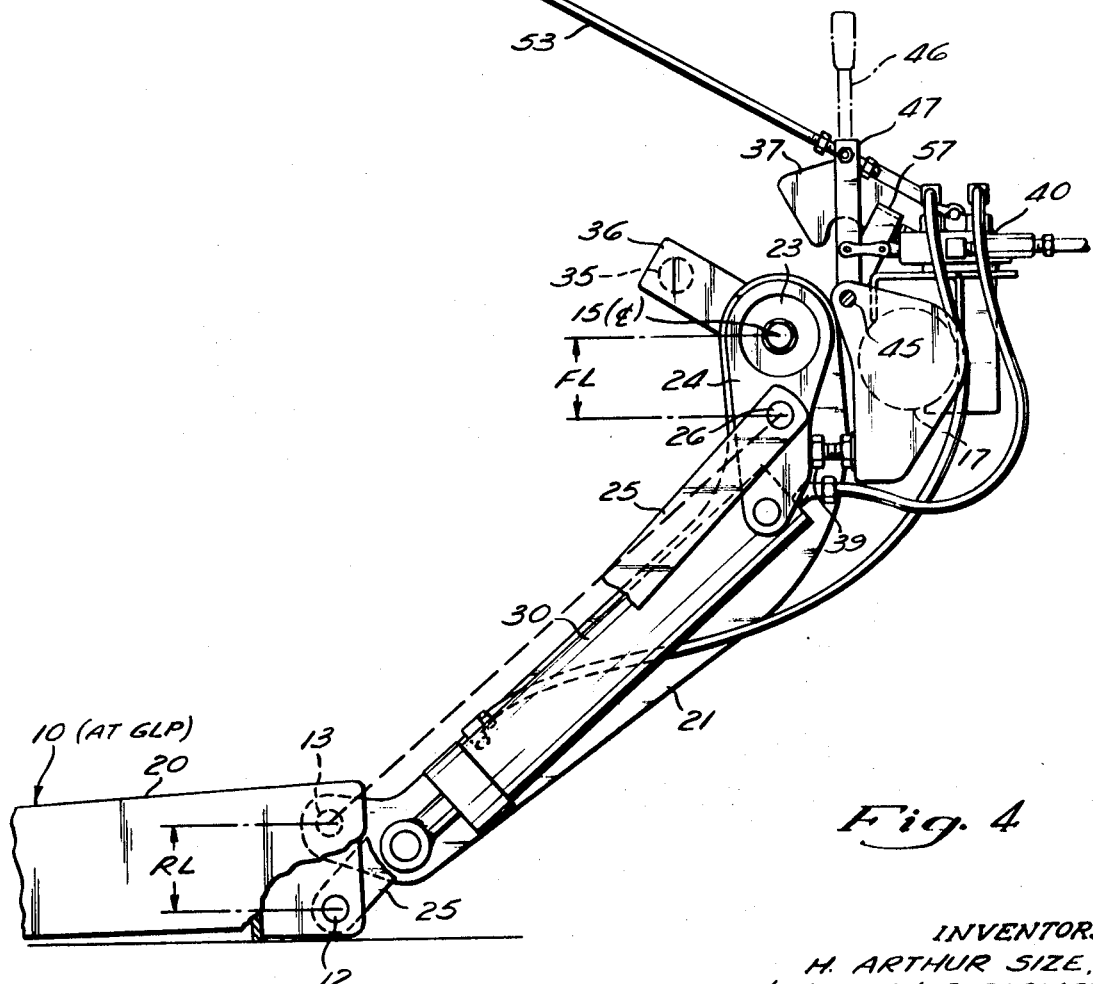
FIG. 4 is a fragmentary side view of the assembled lifting mechanism as shown in FIG. 2, but showing the gate at ground level.
Figure 5:
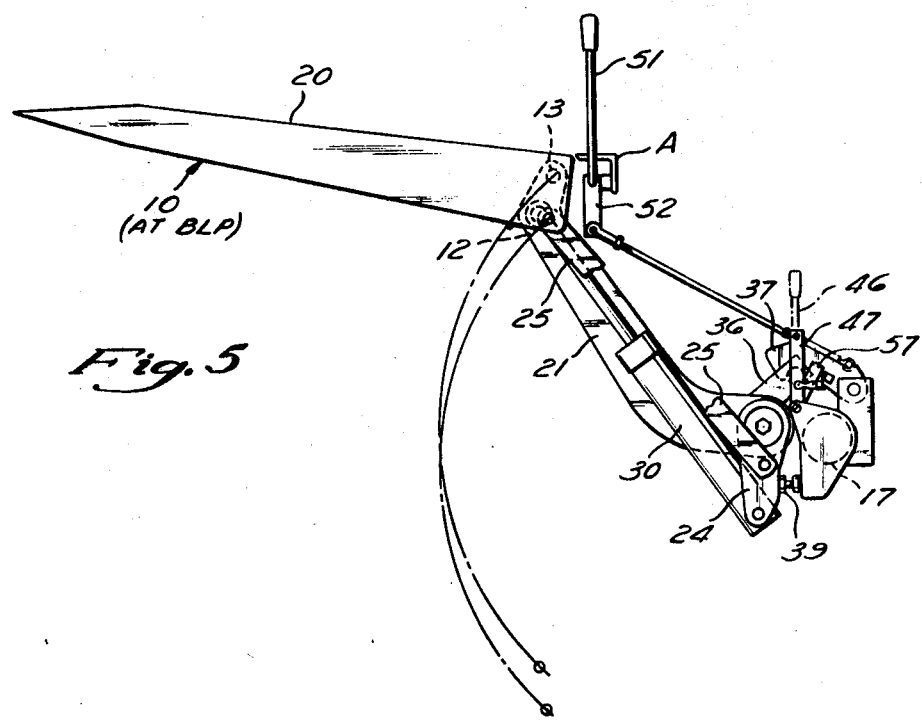
FIG. 5 is a side view similar to FIG. 4, but showing the position of the elements when the gate is raised to bed level.

Referring to FIG. 4 showing the gate 10 and linkage 11 at GLP, it will be noted that the cylinder 30 is contracted and, thus, in this position the force which it can exert is across the short diagonal of the parallelogrammatic linkage 11, as is also indicated by the dash diagonal line between pivot points 13 and 26 in the diagrammatic showing of the linkage at GLP in FIG. 8. Thus, so long as the effective forward link FL is held against counterclockwise rotation by the stop 39, the diagonal force exerted upon extending the length of the cylinder 30 by introducing hydraulic fluid into its cylinder end will force the arms 21 and 25 to pivot upwardly so as to provide a greater diagonal length between the pivot points 13 and 26 until the gate 10 is thereby raised to its bed level position. See the diagrammatic showing of the linkage at BLP in FIG. 8.

Thus, because the controls to be explained hereafter disactivate the hook 37 when it is desired to lower the gate from BLP to GLP, it should be apparent that the disclosed mechanism, through the hydraulically powered lengthening and shorting of the cylinder 30, allows an effectively level (i.e., disregarding the ramping action) raising and lowering of the gate 10 as a loading platform between a ground level position and bed level position and may be stopped and held at any intermediate position (due to the fact that release of the lifting control lever to a neutral position puts the hydraulic control valve in a neutral position which stops flow of fluid to or from the cylinders 40).

Pivoting the gate 10 from bed level position (where the cylinder 30 is extended) to closed position is achieved by powered contraction of the cylinders 30 without, however, disactivating the hook 37 so as to release the pin 35 and its associated lifting arm 21 (as occurs when the gate is lowered from BLP to GLP). Such powered contraction along the diagonal between pivot points 13 and 26 thus pulls the forked links 24 containing the forward links FL away from the stops 39; this action, through the compression links 25, pivots the rear links RL about the pivot points 13 until the gate 10 is pivoted from a horizontal position to a vertical position (see FIG. 7 and the diagrammatic showing of the linkage at the "-gate closed" position in FIG. 8). Actuation of the controls to lengthen the cylinders 30 will correspondingly power the gate at a controlled rate from its closed position to its bed level position; indeed, release of the closing control lever to its neutral position during an opening or closing operation will, as in the release of the lifting control lever during a lifting operation, stop and hold the gate at an intermediate partly closed position.

CONTROLS

In addition to the latching hook 37 carried by the main frame tube 17 as described above, this frame tube also carries two other controls, best seen in FIG. 3; these are a multipart hydraulic fluid valve 40 controlled by a reciprocatable valve stem 41 and an electrical limit switch 43 controlled by a toggle linkage 44. These controls 40 and 43 (and a safety interlock for the hook 37, to be described hereafter) are directly operated by the rotatable gate closing control rod 45 mounted on the main frame tube 17 and extending to an integral gate-closing control lever 46 located at the side of the truck and shown in its neutral position in the several figures of the drawings in which it appears. Adjacent the valve 40, the rod 45 carries an arm 47 linked to the valve stem 41. If the lever 46 is swung clockwise, the valve stem 41 is pushed in, directing fluid under pressure to the piston rod ends of the cylinders 30, thereby contracting them and causing the gate 10 to pivot upwardly to its closed position; if the lever 46 is swung counterclockwise, the valve stem 41 is pulled out, fluid under pressure is directed to the cylinder base ends of the cylinders 30 to extend them and thereby pivot the gate 10 from its closed position to its bed level position; it being understood that during all the foregoing the pin 35 is latched by the hook 37. If the pin should not be so latched during the above-described operation of the control lever 46, as, for example, if the gate should be at an intermediate position between ground level and bed level, counterclockwise movement of the lever 46, lengthening the cylinders 30, would simply lift the gate 10 and clockwise movement, shortening the cylinders 30, would lower it. Because one arm of the toggle linkage 44 is fixed to the control rod 45, actuation of the lever 46 in either direction will close the switch 43 which starts the pumps (not shown) to supply fluid under pressure to the cylinders.

The upper lifting control rod 50, mounted on the truck body angle iron A and actuated by its integral control lever 51, operates the valve 40 and switch 43 by rotating the control rod 50 and also disactivates the hook 37 to permit the gate 10 to be lowered from its bed level position to ground level, as follows: As best shown in FIGS. 1 and 4, the control rod 50 carries an arm 52 to which is pivotally connected a connecting rod 53 extending through an eye 53' secured to the upper end of the valve actuating arm 47 (see FIGS. 2 and 3); adjustable stop nuts on the connecting rod 53 allow its effective length to be adjusted and provide for an adjustable lost-motion connection at the eye 53'. Counterclockwise movement of the lifting operation control lever 51 thus, through the rod 53 and arm 47, operates the valve stem 41 to direct pressure fluid to the piston rod ends of the cylinders 30, shortening them and, thereby, lowering the gate 10 toward the ground level; clockwise rotation of the control lever 51, accordingly, actuates the valve 40 to lengthen the cylinders 30 and thereby raise the gate 10 to its bed level position.

Assuming that the gate 10 is at its bed level position and thereby latched by the hook 37, the hook must be disactivated whenever the gate 10 is to be lowered; this is accomplished by the control lever 51 and rod 50 as follows:

As best shown in FIGS. 1 to 3 and 4a, the rod 50 carries a second arm 56 pivotally connected to a connecting rod 54 extending into a tube 55 which, in turn, is pivotally connected to the hook 37 so that a compression load on the tube 55 pivots the hook 37 against the bias of its spring 38 to lift the hook off the latch pin 35 and thereby free the forward linkage tube 15 for counterclockwise rotation. An adjustable stop nut on the rod 54 permits transmission of a compression load by the rod 54 to the tube 55 while allowing lost motion so that there can be no tension load on the rod 54 to restrain counterclockwise movement of the lever 51 to lengthen the cylinders 30 and thereby raise the gate to bed level.

Figure 6:
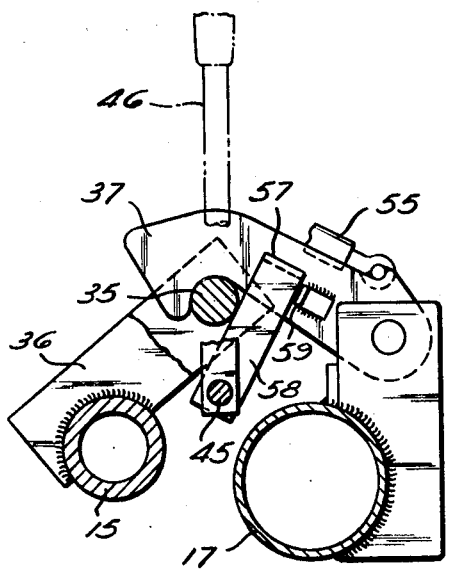
FIG. 6 and 6a are enlarged detail views showing the operation of the latching mechanism and interlock.
Figure 6A:
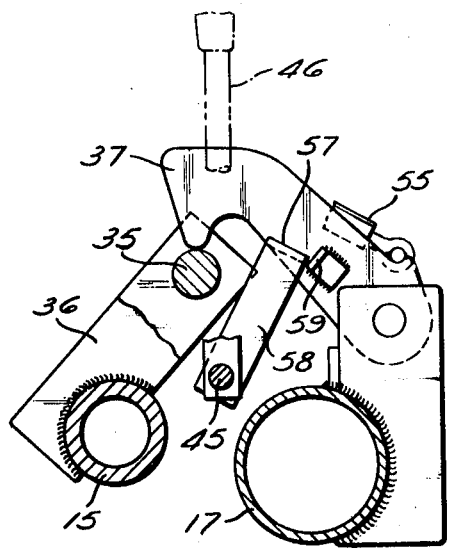

So long as the link forks 24 bear against the stops 39, the cylinders 30 may be safely shortened to lower the gate 10 toward ground level. But if the valve 40 were actuated to shorten the cylinder so as to pivot the gate 10 from bed level to its closed position before the pin 35 was fully seated and locked in the bight of the hook and, thus, in such a partly latched position, liable to cam the hook upwardly and release the pin 35, such a release while the gate was pivoted above its bed level would free the forward linkage tube 15 and allow a free fall of the gate 10 and the linkages 11. To prevent any such accident and prevent the gate from being pivoted above its bed level, unless the pin 35 is fully latched, an interlock is provided. As best shown in FIGS. 3, 6, and 6a, the interlock comprises an arm 58 fixed to the end of the control shaft 45, this arm having an upper bent position 57 extending toward the hook 37. Cooperating with the bent arm 58 is an outstanding tang 59 fixed to the adjacent side of the hook. As shown in FIG. 6, if the pin 35 is fully sealed in the bight of the hook 37, the upper bent portion 57 will clear the tang 59 as the control lever 46 is moved clockwise to actuate the valve 40 and shorten the cylinders 30. But if the hook 37 should not be fully seated on the pin 35, the tang 59 will be raised to interfere with the portion 57 and prevent sufficient clockwise movement of the lever 46 to actuate the valve 40. Likewise, as the valve 40 is actuated by the lever 46, any accidental movement of the control lever 51 to simultaneously raise the hook 37 will be prevented by engagement of the tang 59 against the underside of the portion 57.

From the foregoing it should be apparent that structures made according to this invention may be rugged and withstand hard usage with a minimum of maintenance. In this connection it should be noted that the highly finished surfaces of the piston rods are fully withdrawn into the shortened actuating cylinder 30 when the gate is closed for operation in traffic and other coacting surfaces which might otherwise be affected by weathering and traffic grime are similarly unexposed during normal use in traffic. The relatively few number of parts and elements—permitting a "clean" design and open arrangement—allows for ease of inspection and servicing when necessary. The simplicity of the essentially "fail-safe" operation permits use by unskilled and inattentive personnel. It is to be understood, therefore, that this invention is not limited to the specific embodiments disclosed but may be modified and varies within the scope of the appended claims.

What is claimed is:

1. In a gate for trucks and like load carrying vehicles and its associated operating mechanism for effecting a lifting operation on said gate (raising and lowering loads to and from a relatively horizontal bed level position) and a closing operation (moving said gate to and from said bed level position and a relatively vertical position adapted to close an opening in the vehicle body), the combination comprising a gate structure, a parallelogrammatic linkage adapted to connect said gate to a vehicle body so as to position said gate relatively horizontally and adjacent the bed of said vehicle body at the uppermost position of said lifting operation, said linkage including a first link constituting one link of a pair of opposite links in said linkage and a second link constituting one link of the other pair of opposite links in said linkage, means to exert forces having components selectively extending in opposite directions across a diagonal of said linkage, means to resist rotation of said first link during said lifting operations, and means to hold said second link when said gate is in the uppermost position of said lifting operation while said first link is free to pivot in a direction opposite to that resisted during said lifting operation, whereby operation of said means exerting said diagonal forces effects a closing operation on said gate.

2. A mechanism as defined in claim 1 in which said force-exerting means is a hydraulic cylinder and the component of forces exerted by it extends across the shorter diagonal of said parallelogrammatic linkage when said gate is at its lowermost position in said lifting operation.

3. A mechanism as defined in claim 1 in which the axis of the pivot common to said first and second links is substantially parallel to the edge of the vehicle bed at its loading opening and the mounting of said linkage to said vehicle body fixes the position of said axis with respect to said edge.

4. A mechanism as defined in claim 1 in which said link holding means is automatically actuated when said gate is raised to its uppermost position during said lifting operation.

5. A mechanism as defined in claim 1 including a first control means for actuating said force exerting means during said lifting operation and which disactivates said holding means when said control is actuated to lower said gate during lifting operations.

6. A mechanism as defined in claim 5 including a second control means for actuating said force exerting means but which is incapable of disactivating said holding means, whereby actuation of said second control means effects said closing operations.

7. A mechanism as defined in claim 6 including an interlock preventing said second control means from commencing said closing operations unless said holding means is actuated.

8. A mechanism as defined in claim 1 including at least two of said parallelogrammatic linkages, said linkages being symmetrically located and arranged to minimize distortion of said gate and said linkages by the imposition of an offcenter load on said gate.

9. A mechanism as defined in claim 4 including a first control means for actuating said force exerting means during said lifting operation and which disactivates said holding means when said control is actuated to lower said gate during lifting operations.

10. A mechanism as defined in claim 9 including a second control means for actuating said force exerting means but which is incapable of disactivating said holding means, whereby actuation of said second control means effects said closing operations.

11. A mechanism as defined in claim 10 including an interlock preventing said second control means from commencing said closing operations unless said holding means is actuated.